Sept. 30, 1930.  H. THURKOW  1,777,186

PLOW

Filed Aug. 22, 1928

Inventor
Helmuth Thürkow

By William C. Linton.
Attorney

Patented Sept. 30, 1930

1,777,186

UNITED STATES PATENT OFFICE

HELMUTH THURKOW, OF NEUBAUHOF, NEAR DARGUN, GERMANY

PLOW

Application filed August 22, 1928, Serial No. 301,352, and in Germany August 28, 1927.

The present invention relates to plows, more particularly to that kind of devices adapted to work the soil in separate layers or strata, and has for its primary object the provision of a plow designed to break up and turn the soil in a plurality of layers or strata, and to deposit the richest and most fertile layer or stratum upon the surface and over the other layers of the worked soil.

The invention further aims to provide a plow having a forwardly and rearwardly mounted plow share, each breaking up the soil at a different depth to produce two separate layers or strata, and provided with a mechanism by means of which the first and upper layer or top soil which is known to be the richest in bacteria, may be deposited upon the second and lower worked layer or sub-soil.

Another important object of the invention resides in the provision of the horizontally disposed rotating disk adapted to receive the top soil worked by a first plow share and to carry and deposit the same over the sub-soil worked by a second plow share.

Other important objects and advantages of the invention will be in part obvious and in part pointed out hereinafter.

In order that the invention and its mode of operation may be readily understood by those skilled in the art I have in the accompanying drawings, set out a possible embodiment of the invention.

In these drawings:—

Figure 1:
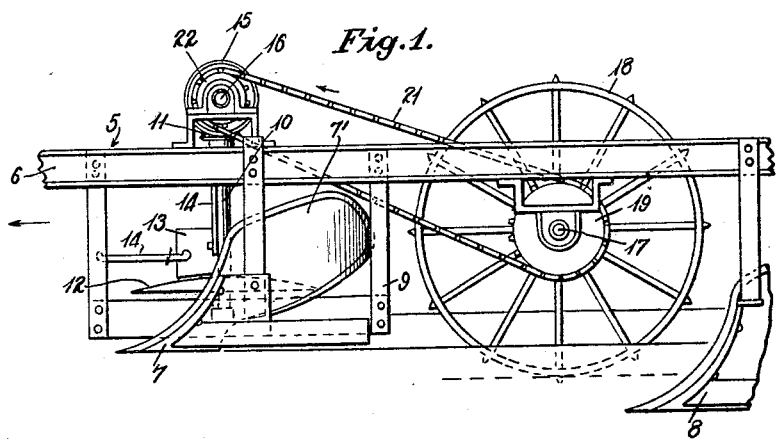
Figure 1 is a side elevation of my improved plow.

Having more particular reference to the drawings wherein like characters of reference will designate corresponding parts throughout, my improved device may be stated to comprise a suitably supported frame 5 consisting preferably of parallel horizontal beams 6. To the forward portion of the frame 5 is secured a plow share 7 adapted to break up at a relatively small depth the upper layer of the soil, and having a soil turning portion inwardly curved as indicated at 7' and more clearly shown in Figure 2 of the drawings. To the rearward portion of said frame 5 is fixed a second plow share 8 designed to break up and turn over the sub-soil at substantially the usual depth and in the ordinary manner.

Fixed to one side of the forward portion of the frame 5 and extending laterally therefrom, is a secondary or auxiliary frame 9 wherein is journaled a vertically mounted shaft 10 carrying at its upper end a beveled pinion 11, and at its lower end a horizontally mounted but slightly inclined disk 12 supported adjacent to the plow share 7 so as to receive the layer of top soil broken up by the plow share 7 and turned by the inwardly curved portion 7' thereof. A plate 13 is suspended by means of bracket rods 14 at substantially right angles and in scraping contact with the upper outwardly curved face of the disk 12.

In mesh with the beveled pinion 11 of the shaft 10 is a bevel gear 15 rigid with a shaft 16 mounted transversely of the main frame 5. Also transversely disposed of this frame 5 is an axle 17 having one end projecting laterally of the frame and carrying a driving wheel 18 engageable with the ground.

Freely mounted upon that portion of the axle 17 extending between the beams 6 of the frame 5, is a sprocket wheel 19 adapted to be actuated upon engagement of a clutch member 20 mounted on the axle 17 and operable through any suitable means known in the art. A chain 21 in engagement with the sprocket wheel 19 and with a second sprocket 22 fixed to the shaft 16, transmits movement to said shaft for rotating through the meshing bevel gear 15 and pinion 11, the shaft 10 and therewith the horizontally disposed disk 12 adjacent the forward plow share 7.

From the foregoing, it will be manifest that in providing means for depositing the richest and most fertile layer of soil broken up and turned by the plow share 7, upon the surface and over the sub-soil worked by the plow share 8, I have provided a device capable of most effectually plowing a field.

Figure 2:
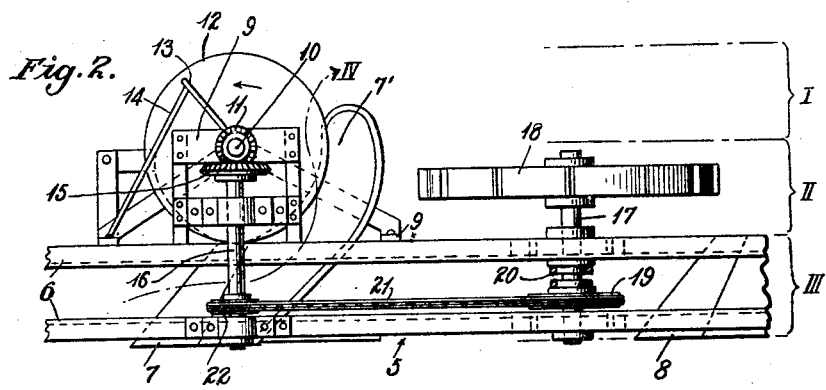
Figure 2 is a plan of the same.
Figure 3:
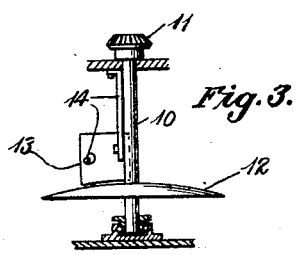
Figure 3 is a detail showing the mechanism embodied in my invention for depositing the upper worked layer or top soil over the worked lower layer or sub-soil.

The operation of the device will be more clearly and fully understood upon referring to Figure 2 of the drawings, wherein I have diametrically shown three successive furrows, I, II and III, respectively.

Still referring particularly to Figure 2, the upper layer or top soil, known to be the richest in bacteria, is broken up and turned by the forward plow share 7 and then directed through the inwardly curved portion 7' of said plow share 7 in the direction of the arrow IV to the disk 12. The disk 12 is rotated by means of the driving wheel 18 when the clutch member 20 is in engagement with the sprocket wheel 19 causing the chain 21 to transmit movement to the shaft 16 which in turn, revolves by reason of the meshing bevel gear 16 and pinion 11, the shaft 10 carrying said disk 12.

The soil following the arrow IV, moves with the disk 12 until it strikes the scraping plate 13, causing the soil to be deposited on the surface and over the sub-soil previously broken up and turned by the plow share 8 from the furrow II into the furrow I. The vertical shaft 10 may be positioned on a slight incline so that the disk 12 carried thereby may tilt or incline towards the furrow I. The inclined position of the horizontally disposed disk 12 will facilitate the distribution of the upper broken layer or top soil. In the position of the plow shown in Figure 4, the lower layer of the soil broken up by the rearward plow share 8 is turned over and deposited in the usual manner from the furrow III in the furrow II, to be subsequently covered as hereinbefore described by the top soil from a new furrow.

It will, therefore, be understood that in practice, the device works over two furrows at a time. Upon making a new furrow, the sub-soil is thrown into the next succeeding furrow while the top soil is projected over this latter furrow and on the surface of the second succeeding furrow.

Manifestly, the construction shown and described is capable of many modifications and those modifications that are within the scope of the claims, I consider within the spirit of my invention.

I claim:—

1. In a plow, a forwardly mounted plow share for breaking up the top soil, a rearwardly mounted plow share for breaking up the subsoil, and means associated with the forwardly mounted plow share for receiving the top soil broken up by the latter and for depositing said broken top soil over and upon the sub-soil broken by said rearwardly mounted plow share.

2. In a plow, means for breaking up the top soil, means for breaking up the sub-soil, a substantially horizontally disposed rotatable disk supported adjacent the top soil breaking means for receiving the broken top soil and depositing the same over and upon the broken sub-soil, and means for rotating said disk.

3. In a plow, a frame, means mounted upon the forward portion of said frame for breaking up the top soil, means mounted upon the rearward portion of the frame for breaking up the sub-soil, a substantially horizontally disposed rotatable disk supported adjacent the top soil breaking means for receiving the broken top soil and depositing the same over and upon the broken sub-soil, a driving wheel journaled in said frame, and means for transmitting movement from said wheel to the disk for rotating the same.

4. In a plow, a frame, means mounted upon the forward portion of said frame for breaking up the top soil, means mounted upon the rearward portion of the frame for breaking up the sub-soil, an auxiliary frame secured to one side of the main frame and extending laterally therefrom, a rotatable disk horizontally supported in said auxiliary frame adjacent the forward top soil breaking means for receiving the broken top soil and depositing the same over and upon the broken sub-soil, a driving wheel journaled in the main frame, and means for transmitting movement from said wheel to the disk for rotating the same.

5. In a plow, a frame, a plow share mounted upon the forward portion of said frame for breaking up the top soil, a second plow share mounted upon the rearward portion of the frame for breaking up the sub-soil, an auxiliary frame secured to one side of the main frame and extending laterally therefrom, a substantially horizontally disposed but slightly inclined disk supported in the auxiliary frame adjacent the forward plow share for receiving the broken top soil and depositing the same over and upon the broken sub-soil, a plate suspended in scraping contact with the disk for distributing the broken top soil, a driving wheel journaled in the main frame, and means for transmitting movement from said wheel to the disk for rotating the same.

In witness whereof I have hereunto set my hand.

HELMUTH THURKOW.